Oct. 18, 1938.  E. M. GARDNER  2,133,613
DRILLING MACHINE
Filed May 19, 1937    2 Sheets-Sheet 1
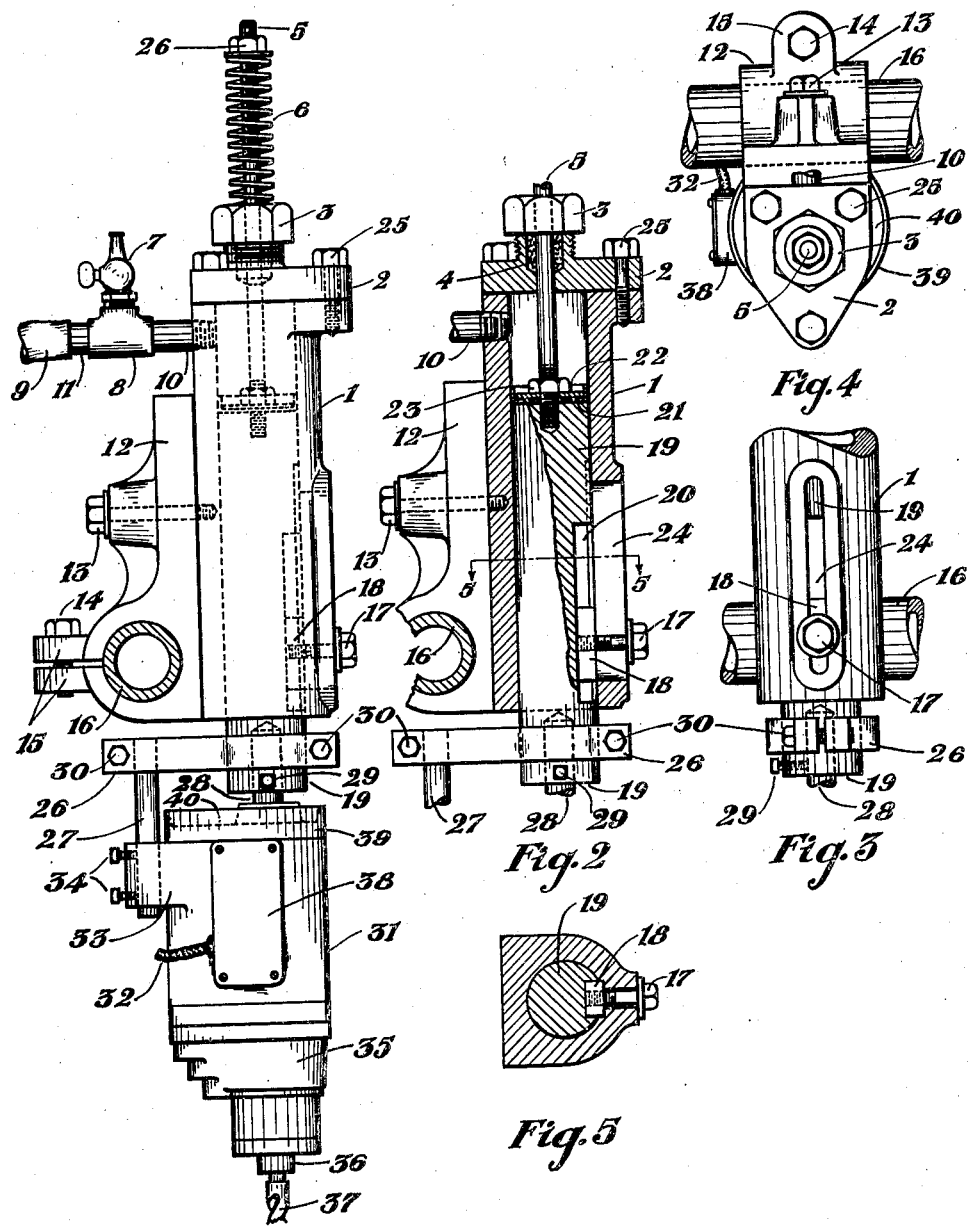
INVENTOR
Edward M. Gardner
BY John L. Milton
ATTORNEY Oct. 18, 1938.   E. M. GARDNER   2,133,613
DRILLING MACHINE
Filed May 19, 1937   2 Sheets-Sheet 2
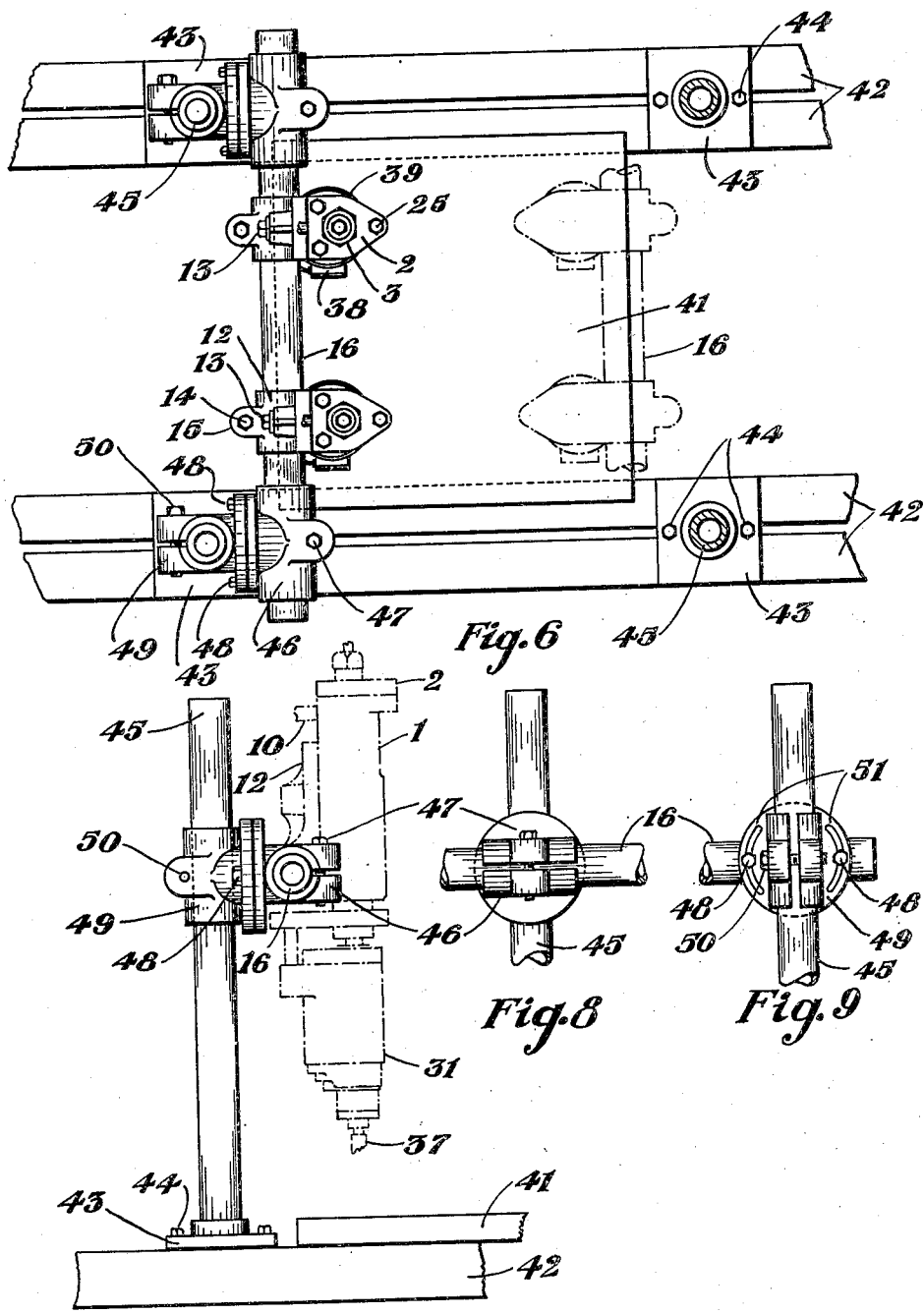
INVENTOR
Edward M. Gardner
BY John L. Milton
ATTORNEY Patented Oct. 18, 1938

2,133,613

UNITED STATES PATENT OFFICE 2,133,613

DRILLING MACHINE

Edward M. Gardner, New Albany, Ind., assignor to S. J. Gardner Foundry & Machine Co., Incorporated, New Albany, Ind., a corporation of Indiana Application May 19, 1937, Serial No. 143,539

10 Claims. (Cl. 144—112)

This invention relates to machine tools and especially to drilling machines wherein the cutter is moved into and out of engagement with a work-piece by hydraulic mechanism.

The invention more particularly relates to a drilling machine adapted to bore holes at various angles, or parallel.

The primary object of this invention is to render available a simple and efficient self-contained feed mechanism for giving to a suitable tool carrier advance and retroactive movements.

Another object of this invention is to provide a plurality of such tool carriers with said feed mechanisms, whereby a plurality of machining operations may be simultaneously performed upon one, or a plurality of work-pieces.

A further object of this invention is to render available a mounting for said mechanisms whereby the tool carriers may be adjusted to occupy various angularly related positions simultaneously in all three planes, with any desired distance between tool centers.

A still further object of this invention is to provide each mechanism with an individual depth gauge, whereby each boring tool may be adjusted to bore to any desired depth.

A further object of this invention is to provide a central hydraulic pressure plant with suitable connections to each feed mechanism having the required valves to permit said mechanisms to be operated either simultaneously or individually.

It is still another object of this invention to provide other valves in each connection to regulate individually the rate of fluid flow to each mechanism, whereby each boring tool may be individually regulated for proper feed into its respective work-piece.

A further object of this invention is to render available a simple angle boring machine wherein the tool carrier comprises the spindle of an electric motor, and wherein the entire motor is rigidly secured to and carried by the plunger of a hydraulic feed mechanism, thereby eliminating entirely, linkages, sliding connections, pivots, etc., between the feed mechanism and tool carrier that usually become worn and impair the accuracy of the machine. A further object of such an arrangement is to reduce to a practical minimum the number of moving parts and yet provide a construction that will permit the greatest flexibility in adjustments for the various machining operations that may be required for the machine to perform.

A further object of this invention resides in not only utilizing the plunger of the hydraulic feed mechanism to support the electric motor and tool carrier, but to utilize said plunger to take up the torque reaction of the tool and motor.

A principal advantage of this invention resides in utilizing all of the advantages in the way of accuracy and precision, with the low cost, economy of space, and mobility incident to ordinary manually portable power driven drills, while eliminating entirely the disadvantages on account of the necessity for manually supporting and directing them, and performance of but one operation at a time.

An important feature of the construction of this invention resides in the means for mounting, and axially operating, the motor and tool carrier, whereby ease and accuracy of operation are retained without requiring extreme accuracy in the machining of the parts, resulting in a great saving in the cost in production.

Due to endeavors of tool designers and manufacturers to provide machine tools for quantity production that are flexible in adjustment, and at the same time meet the demand for so-called "universal" and "multiple" tools, which may be used to perform a plurality of operations on a single work-piece, these machine tools have become very complicated in construction and consequently very costly to manufacture. The present invention overcomes this complicacy of construction and provides an improved and simplified machine that is well adapted to perform the operations of the more complicated prior constructions.

Other objects of the invention reside in the details of construction and combination of parts and in their mode of operation, as will hereinafter be described.

In accomplishing these and other objects, I have provided the improved details of construction; the preferred forms of which are illustrated in the accompanying drawings, wherein—

Figure 1 is a side elevation of a unitarily constructed boring unit embodying the present invention.

Figure 2 is a side elevation of the hydraulic feed mechanism shown in partial section.

Figure 3 is a partial front elevation showing the screw adjustment for the depth gauge.

Figure 4 is a plan view of Figure 1.

Figure 5 is a section taken along line 5—5, of Figure 2, showing the piston and depth gauge.

Figure 6 is a plan view illustrating a plurality of boring units, shown in Figure 1, arranged arbitrarily on a suitable supporting table with provision whereby each feed mechanism may be connected to a common fluid pressure line adapted to be controlled by a valve or valves located adjacent the operator's normal working position.

Figure 7 is an elevational view of one of the upright posts shown in Figure 6.

Figure 8 is a front elevational view of the post clamp shown in Figure 7, while;

Figure 9 is a rear elevational view of said clamp.

Briefly described, the present machine comprises a table across which a work-piece may be placed, a conventional clamping device, or guide, is arranged to locate and hold the work-piece on the table during the boring operation, while above the table are arranged the boring tools. The boring tools are electrically driven while the tool carriers are raised and lowered by hydraulic means to which a pressure medium is admitted under control of a valve mechanism. The valve mechanism is arranged for manual control, however any well known automatic control may be substituted therefor.

Referring more in detail to the drawings—

In Figure 6, the various parts comprising the multiple boring machine are shown mounted on a table or main frame structure 42. The work-piece is normally laid on a guide or base 41 that is secured to table 42. Four boring tool units are illustrated as being supported, above the work-piece guide 41, by a mounting structure that is secured to the main frame structure 42 by clamping bolts 44.

The mounting structure comprises two pairs of upright supporting posts 45; each post 45 being equipped with a flanged base 43 that is constructed and arranged to be horizontally adjustable in suitable slots fashioned in the main frame structure 42.

Each pair of supporting posts 45 is provided with a horizontal bar 16, adjustably carried by clamp castings 46 and 49.

Referring in particular to Figure 7, it will be observed that each upright supporting post 45 is provided with a clamp casting 49 that is secured thereto by a clamping bolt 50. A similar clamp casting 46 is secured to each clamp casting 49 by bolts 48, and each clamp 46 is arranged for rotational adjustment through the medium of arcuate slots 51, shown in Figure 9.

Each horizontal bar is secured in its respective clamp castings 46 by means of clamping screws 47.

As illustrated in Figure 6, two boring tool units are mounted on each horizontal bar 16, however, more or less units may be mounted on each bar 16, dependent upon the requirements of the machining operation.

To provide adjustable mounting of each boring tool unit on the horizontal bars 16, each unit is provided with a clamp casting 12 that is secured to its respective bar 16 through the medium of a clamp bolt 15.

Referring now in particular to Figure 1, it will be observed that each boring tool unit is pivotally secured to a clamp casting 12, by a clamping bolt 13.

From the foregoing it will be apparent that the height of each horizontal bar 16, with respect to the main frame structure 42, may be varied by moving the corresponding clamp castings 49 vertically along their respective supporting posts 45, and that when it is desired to place either or both of the horizontal bars in an angular position, with respect to the top surface of the main frame structure 42, the corresponding clamp castings 46 are angularly adjusted with respect to their respective clamp castings 49, through the medium of clamping bolts 48 and arcuate slots 51.

It will also be apparent that the centers of the boring units, mounted on each horizontal bar 16, may be varied by sliding their respective clamp castings 12 horizontally along bar 16, while the centers between the units carried by each bar may also be varied by sliding the flanged bases 43 along the horizontal slots in the main frame structure 42.

In Figures 6 and 7, the boring tool units are illustrated in a vertical position. However, it is to be understood that, by reason of the pivotal mounting on bolt 13, each boring tool may be angularly pointed toward the center of the guide or base 41, thereby being in position to drill simultaneously four angularly related holes in a single work-piece; as for instance, the four holes in a chair seat that receive the chair legs. It is also to be understood that the boring units, carried by one horizontal bar 16, may be adjusted to drill substantially vertical holes, while the boring units of the other bar 16 may be adjusted to bore substantially horizontal holes; all of which holes may be simultaneously made in a single work-piece, as for instance, the angled holes of a chair leg that receive the chair rungs.

At the start of a machining operation, and also at the completion thereof, the boring units are in their retracted positions.

After a work-piece has been properly located on the guide or work-piece base 41, the tool of each boring unit is brought down against the work-piece by action of the hydraulic feed mechanisms, provided for each boring unit, by actuation of a control valve or valves by the operator.

Normally the electric motors of each boring unit rotates its respective boring tool continuously. However, it is to be understood that an electric switch may be provided to remove current from the electric motors at all times except when fluid pressure is being admitted to each hydraulic mechanism.

In accordance with this invention, each boring tool unit is identical in construction, therefore, the description of one unit will be sufficient.

Referring in particular to Figure 1, it will be observed that each boring tool unit comprises an electric drill 31, similar in construction to the customary portable electric drill. Such a drill consists of a suitable gear reduction mechanism and housing 35, and spindle 36 for receiving a boring tool or bit 37. To facilitate connecting the electrical connection 32 to the motor of the drill, a junction box 38 is provided. While I have elected to illustrate an electrically driven drill, in this embodiment of my invention, it is to be understood that any other suitable mechanism for rotating the boring tool may be substituted therefor. Likewise, any other machine tool may be substituted for the particular boring tool mentioned without departing from the spirit of the invention.

Since a small amount of fluid leakage may be encountered in the operation of my hydraulic mechanism, it is proposed to construct or provide a suitable drip tray 40 in the end plate 39 of each drill mechanism 31.

To guide and support the drill mechanism, a shaft 28, which carries the end plate 39, is secured to the lower end of the hydraulic piston 19 by means of a set-screw 29.

To take-up the torque reaction of the drill mechanism 31, a clamp 26 is secured to the end of piston 19 by means of a clamp bolt 30. The clamp 26, at its other end, projects outwardly from the piston 19, embracing a rod 27 which in turn is secured thereto by a similar clamp bolt 30. The rod 27 is rigidly secured to a lug 33, carried by the drill mechanism 31, by means of set screws 34. Thus the torque reaction of the drill mechanism 31 is taken-up by the piston 19, which in turn transmits same to the stationary supporting structure through the reaction of piston 19 against the vertical sides of depth gauge 18.

The hydraulic feed mechanism comprises a cylinder 1 and piston 19. To facilitate manufacturing, the cylinder is constructed with a removable head 2 that is attached to the cylinder by means of bolts 25. A piston rod 5 is secured to the upper end of piston 19, which extends through packing 4 and gland nut 3 carried by head 2. To restore piston 19 to its normal retracted position, a compression spring 6 reacts between a washer and nut carried by piston rod 5 and the top of gland nut 3.

The pressure medium, for operating the hydraulic feed mechanism, is delivered from a source of supply through a suitable flexible supply line 9 to pipe nipple 11, thence through pipe T 8 and pipe nipple 10 to cylinder 1. As hereinbefore mentioned, a suitable control valve is inserted in supply line 9, between the source and cylinder, to control the admittance of fluid pressure to the hydraulic feed mechanism. To facilitate priming of the hydraulic mechanism, an air cock 7 is provided in the angled opening of pipe T 8.

To provide for satisfactory adjustment and for accuracy, in the depth of boring, a depth gauge 18 is provided that is vertically adjustable in slot 24. To adequately secure the depth gauge in proper position a clamping screw 17 is provided. Figures 2, 3 and 5 clearly show the construction of the depth gauge.

Referring in particular to Figure 2, it will be observed that piston 19 is provided with a groove or slot 20 which serves to provide the necessary abutting surfaces to contact depth gauge 18 at the end of the piston travel in the power stroke. It will be further observed that piston 19 is provided with a suitable cup-washer 21 which is held in place by washer 22 and nut 23.

In Figures 1, 2 and 4 the clamp casting 12 that serves to mount the hydraulic feed mechanism on its respective horizontal bar is shown. Particular attention is directed to the fact that a single clamping bolt 13 serves to secure the hydraulic mechanism to its respective clamp casting 12. Thus, it will be obvious that the hydraulic mechanism, in addition to being rotated about its respective horizontal bar 16, may also be rotated about its clamping bolt 13. Therefore, as treated at the outset of this description, particular emphasis is placed upon the extreme flexibility in the angular adjustment of the boring units.

Having thus described my invention, I claim:

1. A supporting structure for a power driven rotary tool comprising, a table; a pair of substantially vertical posts mounted on said table; a cross beam having a vertically-adjustable supporting connection with each of said posts, each of said supporting connections having means providing adjustment of said cross beam to various angular positions relative to said posts, and for securing same in adjusted relation; a carriage horizontally movable on said cross beam, and a hydraulic cylinder attached to said carriage having a piston providing the sole support for a power driven rotary tool secured to the free end of said plunger.

2. A supporting structure for a power driven rotary tool comprising, a table; a pair of substantially vertical posts mounted on said table; a cross beam having a vertically-adjustable supporting-connection with each of said posts, each of said connections being provided with a radial adjustment whereby said beam may be angularly adjusted with respect to said posts; and a carriage for said power driven rotary tool, horizontally movable on said beam, being constructed and arranged so that said tool may be adjusted in a plane at right angles to said beam by adjustably rotating said carriage about said beam.

3. A supporting structure for a power driven rotary tool comprising a stationary horizontal beam adjustably carried by a pair of vertical posts; a carriage horizontally movable on said beam and constructed and arranged for rotation about said beam to provide an adjustment in a plane at right angles to said beam; a hydraulic cylinder pivotally attached to said carriage having the pivotal axis of said attachment substantially at right angles to the piston of said cylinder to provide an adjustment in a plane parallel to said beam; means securing a power driven rotary tool to the free end of said piston, whereby said tool may be advanced into boring position by said hydraulic mechanism; and means, cooperating with said piston and said power driven rotary tool, transmitting the torque reaction of the said power driven rotary tool through said piston to said stationary beam.

4. A supporting structure for a power driven rotary tool comprising a frame; a hydraulic cylinder adjustably carried by said frame being constructed and arranged for adjustment to any angular position with respect to a work piece; means securing said power driven rotary tool to the free end of the piston of said hydraulic mechanism, and providing the sole support for said tool; and means, cooperating with said piston and said power driven rotary tool, transmitting the torque reaction of said power driven rotary tool through said piston to said frame, and limiting the travel of said piston when a fluid pressure is admitted into said hydraulic mechanism to move said tool into operative relation with said work piece.

5. A supporting structure for a power driven rotary tool comprising a relatively stationary hydraulic cylinder frame mounted above a work piece; a piston projecting from said cylinder and towards said work piece; a power driven rotary tool secured to and supported entirely by the free end of said piston, and having the axis of rotation of said tool substantially coincident with the axis of said piston; and means, cooperating with said piston and said power driven rotary tool, transmitting the torque reaction of said tool to said frame while said tool is moved into and held in operative relation with said work piece by hydraulic pressure admitted to said hydraulic mechanism.

6. A supporting structure for a power driven rotary tool comprising a relatively stationary hydraulic cylinder mounted above a work piece; a piston projecting from said cylinder and towards said work piece; means securing said power driven rotary tool to the free end of said piston having the axis of rotation of said tool substantially coincident with the axis of said piston; means adapted to admit fluid pressure into said cylinder to cause said piston to move said tool into and hold same in operative relation with said work piece; a rod secured to the opposite end of said piston and projecting beyond the upper end of said cylinder; a compression spring reacting between said rod and said cylinder tending to support the tool out of engagement with said work piece; and a key, carried by said cylinder and operating in a keyway fashioned in said piston, cooperating with said piston to transmit the torque reaction of said power driven rotary tool to said cylinder and to limit the travel of said piston when fluid pressure is admitted into said cylinder.

7. A supporting structure for a power driven rotary tool comprising a relatively stationary hydraulic cylinder mounted above a work piece; a piston projecting from said cylinder and towards said work piece; means securing said power driven rotary tool to the free end of said piston such that the axis of rotation of said tool is substantially coincident with the axis of said plunger; a spring operatively connected to said piston and tending normally to support the tool out of engagement with the work piece; and means adapted to admit fluid pressure to said cylinder to cause said piston to move said tool into and hold same in engagement with said work piece; and a key, adjustably carried by said cylinder, cooperating with said piston to limit the travel thereof when fluid pressure is admitted into said hydraulic mechanism, and transmitting the torque reaction of said tool to said cylinder.

8. A boring machine having, in combination, a stationary table; a pair of substantially vertical posts mounted on said table; a cross-beam having a vertically-adjustable supporting-connection with each of said posts, each of said connections having means providing adjustment of said cross-beam to various angular positions relative to said posts, and for securing same in adjusted relation; a carriage adjustably movable lengthwise on said beam and having means providing adjustment of said carriage in a plane substantially at right angles to said beam by adjustably rotating said carriage about said beam; a supporting member pivotally connected to said carriage, the axis of the pivotal connection being substantially at right angles to said beam, to provide adjustment of said member in a plane substantially parallel with said beam; a reciprocating plunger mounted in said member for reciprocation substantially at right angles to said pivotal connection; an electric motor and a bit spindle driven by said motor, carried by and movable with said plunger; and means for reciprocating said plunger, motor and said bit spindle in any angular position of said supporting member.

9. A boring machine having, in combination, a supporting pedestal provided with a horizontal cross-beam having a vertically-adjustable supporting-connection with said pedestal and means providing adjustment of the cross-beam to various horizontal and vertical angular-positions with respect to said pedestal; a carriage adjustably movable lengthwise on said beam and having means providing adjustment of said carriage in a plane substantially at right angles to said beam by adjustably rotating the carriage about said beam; a supporting member pivotally connected to said carriage, the axis of the pivotal connection being substantially at right angles to said beam, to provide adjustment of said supporting member in a plane substantially parallel to said beam; a reciprocating plunger mounted in said member for reciprocation substantially at right angles to said pivotal connection; an electric motor and a bit spindle driven by the electric motor, carried by and movable with said plunger; means for reciprocating said plunger, motor and bit spindle in any angular position of said supporting member; and means transmitting the torque reaction of said motor to said supporting member and limiting the reciprocating movement of said plunger.

10. A boring machine having, in combination, a supporting pedestal; a horizontal cross-beam having a vertically-adjustable supporting-connection with said pedestal, said connection having means providing adjustment of the cross-beam to various horizontal and vertical angular-positions with respect to said pedestal; a carriage adjustably movable lengthwise on said beam and having means providing adjustment of said carriage in a plane substantially at right angles to said beam by adjustably rotating the carriage about said beam; a supporting member pivotally connected to said carriage, the axis of the pivotal connection being substantially at right angles to said beam, to provide angular adjustment of said supporting member in a plane substantially parallel to said beam; a reciprocating member having a slidable connection with and lengthwise movable on said supporting member for reciprocation substantially at right angles to said pivotal connection; an electric motor and a bit spindle driven by the electric motor, carried by and movable with said reciprocating member; and means for reciprocating said reciprocating member, motor and bit spindle in any angular position of said supporting member.

EDWARD M. GARDNER.